United States Patent
Witkowski et al.

(10) Patent No.: US 10,162,854 B2
(45) Date of Patent: Dec. 25, 2018

(54) COLLABORATIVE CLOUD-BASED CONTENT CURATION IN REAL-TIME

(71) Applicant: Disney Enterprises, Inc., Burbank, CA (US)

(72) Inventors: Robert Witkowski, Valencia, CA (US); Bradley Wall, Sherman Oaks, CA (US); Jon Edwards, Anaheim, CA (US)

(73) Assignee: Disney Enterprises, Inc., Burbank, CA (US)

( * ) Notice: Subject to any disclaimer, the term of this patent is extended or adjusted under 35 U.S.C. 154(b) by 109 days.

(21) Appl. No.: 15/600,620

(22) Filed: May 19, 2017

(65) Prior Publication Data

US 2018/0253470 A1 Sep. 6, 2018

Related U.S. Application Data

(60) Provisional application No. 62/465,728, filed on Mar. 1, 2017.

(51) Int. Cl.
*G06F 17/20* (2006.01)
*G06F 17/30* (2006.01)
(Continued)

(52) U.S. Cl.
CPC ........ *G06F 17/30412* (2013.01); *G06F 3/048* (2013.01); *G06F 17/30029* (2013.01); *G06Q 10/101* (2013.01); *H04L 67/10* (2013.01); *H04N 21/234* (2013.01); *H04N 21/236* (2013.01); *H04N 21/23424* (2013.01);
(Continued)

(58) Field of Classification Search
CPC .............. G06F 17/30412; G06Q 30/02; H04N 21/6106; H04N 21/6125
See application file for complete search history.

(56) References Cited

U.S. PATENT DOCUMENTS 7,188,173 B2 * 3/2007 Anderson ............... H04L 63/12
709/223
7,685,436 B2 * 3/2010 Davis ...................... G06F 21/72
713/153

(Continued)

FOREIGN PATENT DOCUMENTS

EP 2787663 10/2014

*Primary Examiner* — Mohammed H Zuberi
(74) *Attorney, Agent, or Firm* — Farjami & Farjami LLP

(57) ABSTRACT

A collaborative cloud-based content curation system includes a content curation platform having a hardware processor, a memory, a master control automation unit stored in the memory, and a web-based affiliate operations portal. The hardware processor executes the master control automation unit to receive a content feed and trigger insertion instructions from an affiliate content provider, and to receive traffic log data for the affiliate content provider via the web-based affiliate operations portal. The master control automation unit curates a digital rights cleared content stream from the content feed, produces a corresponding electronic programming guide (EPG), and generates an IP transport stream for distributing the digital rights cleared content stream and the EPG. The master control automation unit also receives, after distribution of the digital rights cleared content and the EPG, a traffic log update data, and updates the EPG in real-time.

20 Claims, 4 Drawing Sheets

(51) Int. Cl.
  *G06Q 10/10*   (2012.01)
  *H04N 21/234*  (2011.01)
  *H04N 21/254*  (2011.01)
  *G06F 3/048*   (2013.01)
  *H04L 29/08*   (2006.01)
  *H04N 21/236*  (2011.01)
  *H04N 21/2665* (2011.01)
  *H04N 21/845*  (2011.01)
  *G06Q 50/00*   (2012.01)

(52) U.S. Cl.
  CPC ..... *H04N 21/2541* (2013.01); *H04N 21/2665* (2013.01); *H04N 21/8455* (2013.01); *G06Q 50/01* (2013.01)

(56) References Cited

U.S. PATENT DOCUMENTS

| | | | | |
|---|---|---|---|---|
| 7,787,818 B2* | 8/2010 | Shapiro | ............... | G06Q 30/02 455/3.01 |
| 7,962,580 B2* | 6/2011 | Gagliardi | ............ | G06F 17/3089 709/219 |
| 8,150,798 B2* | 4/2012 | Ma | ............... | G06Q 50/184 705/310 |
| 8,200,775 B2* | 6/2012 | Moore | ............... | G06F 17/3089 709/217 |
| 8,325,744 B2* | 12/2012 | Brehm | ............... | H04L 41/0893 370/401 |
| 8,489,731 B2* | 7/2013 | Gagliardi | ............... | H04L 43/045 709/219 |
| 8,498,628 B2* | 7/2013 | Shapiro | ............ | H04N 21/25891 455/414.3 |
| 8,566,857 B2* | 10/2013 | Putnam | ............... | H04H 20/14 725/22 |
| 8,826,314 B2* | 9/2014 | Wang | ............... | H04L 65/80 375/240.12 |
| 8,929,278 B2* | 1/2015 | Ling | ............... | H04H 20/08 370/316 |
| 2007/0220544 A1* | 9/2007 | Nash-Putnam | ........ | H04H 20/14 725/32 |
| 2011/0126226 A1 | 5/2011 | Makhlouf | | |
| 2014/0259051 A1 | 9/2014 | Strein | | |

* cited by examiner ics engine 126, secondary/event trigger and pod manipulation
COLLABORATIVE CLOUD-BASED CONTENT CURATION IN REAL-TIME

RELATED APPLICATION(S)

The present application claims the benefit of and priority to a pending Provisional Patent Application Ser. No. 62/465,728, filed Mar. 1, 2017, and titled "Collaborative Cloud-Based Content Curation in Real-Time," which is hereby incorporated fully by reference into the present application.

BACKGROUND

Consumers of television (TV) program content now have a level of control over when, where, and how they will consume their programming of choice that was simply unavailable to previous generations of TV viewers. For example, the ever-increasing variety of program content available online has enabled consumers to selectively access TV program content using a computer, a tablet, a smartphone, a smart TV, Internet-enabled televisions, or other devices connected to televisions, rather than through use of a traditional TV set when at home, or through use of a mobile communication device while traveling or otherwise away from home.

The increased viewing options for consumers of TV program content have created significant challenges for content providers attempting to assure viewer loyalty while ensuring digital rights compliance. For example, distribution rights covering delivery of program content over a particular distribution channel, such as a linear TV broadcast, may not cover digital distribution of the same program content over the Internet. However, conventional approaches to converting a linear TV content feed into a digital content stream for which digital distribution rights are in place are typically burdensome, costly, and often require human involvement or direction. Consequently, there is a need in the art for a solution capable of substantially automating the collaborative curation of digitally rights cleared content for distribution over the Internet.

SUMMARY

There are provided systems and methods for performing collaborative cloud-based content curation in real-time, substantially as shown in and/or described in connection with at least one of the figures, and as set forth more completely in the claims.

DETAILED DESCRIPTION

Figure 1:
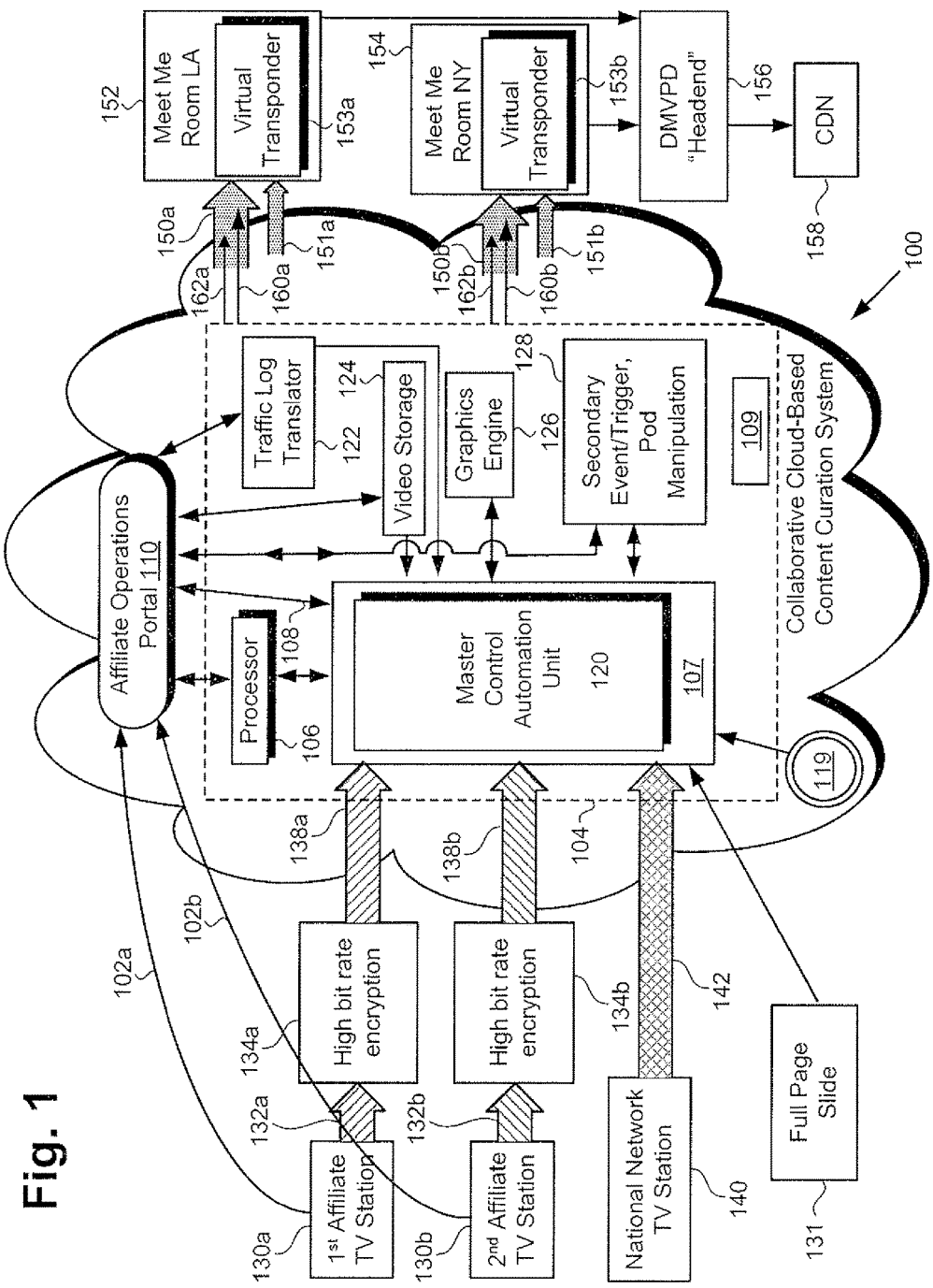
FIG. 1 shows a diagram of a collaborative cloud-based content curation system, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As noted above, the increased viewing options for consumers of television (TV) program content enabled by advances in technology have created significant challenges for content providers attempting to assure viewer loyalty while ensuring digital rights compliance. For example, there may be types of content included in a linear TV broadcast for which the TV broadcaster does not have Internet distribution rights.

The present application is directed to a cloud-based solution configured to enable collaborative cloud-based content curation in real-time using a web-based operations portal accessible by a broadcast affiliate. The present application discloses a novel solution by which fully conditioned Internet Protocol (IP) transport streams including digital television or other digital video content can be created in a virtual environment through collaboration between national and local programming providers.

FIG. 1 shows a diagram of collaborative cloud-based content curation system 100, according to one exemplary implementation. As shown in FIG. 1, collaborative cloud-based content curation system 100 includes content curation platform 104 and web-based affiliate operations portal 110. Content curation platform 104 includes hardware processor 106, and memory 107 storing master control automation unit 120, traffic log translator 122, video storage 124, graphics engine 126, secondary/event trigger and pod manipulation module 128, and dynamic failsafe switcher 129. As further shown in FIG. 1, web-based affiliate operations portal 110 is interactively linked to master control automation unit 120 via network communication link 108.

According to the present exemplary implementation, collaborative cloud-based content curation system 100 is utilized in a content distribution environment including first affiliate content provider 130a providing content feed 132a, second affiliate content provider 130b providing content feed 132b, and national network content provider 140 providing transmission 142, which may be a high bit rate encrypted transmission. It is noted that according to the exemplary implementation shown in FIG. 1, national network content provider 140 is represented as a national network TV station, while first and/or second affiliate content providers 130a and 130b may be TV stations affiliated with the national network TV station but broadcasting content feeds 132a and 132b to respective local audiences. In other words, one or both of content feeds 132a and 132b may be TV broadcast feeds.

The exemplary content distribution environment in which collaborative cloud-based content curation system 100 is utilized also includes high bit rate encryption services 134a and 134b producing high bit rate encrypted content feeds 138a and 138b from respective content feeds 132a and 132b. Also shown in FIG. 1 are network communication links 102a and 102b, evergreen/emergency content reel 119, full page slide 131, digital rights cleared content streams 160a and 160b, electronic programming guides (EPGs) 162a and 162b, IP transport streams 150a and 150b, and out-of-band program data and/or metadata 151a and 151b. In addition, FIG. 1 shows Los Angeles based Meet Me Room 152 including virtual transponder 153a, New York based Meet Me Room 154 including virtual transponder 153b, Digital Multi-channel Video Programming Distributor (DMVPD) "headend" 156, and content delivery network (CDN) 158.

Collaborative cloud-based content curation system 100 is configured to receive content feeds 132a and 132b, either directly from first and second affiliate content providers 130a and 130b, or via high bit rate encryption services 134a and 134b as high bit rate encrypted content feeds 138a and 138b. In addition, collaborative cloud-based content curation system 100 may be configured to receive high bit rate encrypted transmission 142 directly from national network content provider 140.

As a specific example, first affiliate content provider 130a may be a local Los Angeles based content provider corresponding to affiliate KXYZ-TV of a New York based parent station of the XYZ Broadcasting Company and depicted as national network content provider 140. Moreover, second affiliate content provider 130b may be a local Buffalo based content provider corresponding to affiliate WKBXYZ-TV of the XYZ Broadcasting Company.

According to the exemplary implementation shown in FIG. 1, first affiliate content provider 130a and second affiliate content provider 130b provide respective content feeds 132a and 132b for delivery into collaborative cloud-based content curation system 100. Content feeds 132a and 132b may include triggers and/or digital rights cleared content. Triggers may take the form of digital or analog signals included in content feeds 132a and/or 132b to identify the start points and/or end points of content, which may include programming content, locations of ads or ad pods, or short form content, for example. For example, the triggers included in content feeds 132a and 132b may be Society of Cable Telecommunications Engineers (SCTE) triggers.

According to the present exemplary implementation, content feed 132a undergoes high bit rate encryption performed by high bit rate encryption service 134a and is ingested by master control automation unit 120 as high bit rate encrypted content feed 138a. Similarly, content feed 132b undergoes high bit rate encryption performed by high bit rate encryption service 134b and is ingested by master control automation unit 120 as high bit rate encrypted content feed 138b.

In addition to high bit rate encrypted content feeds 138a and 138b, master control automation unit 120 ingests high bit rate encrypted transmission 142 from national network content provider 140. High bit rate encrypted transmission 142 from national network content provider 140 may also include triggers, such as SCTE triggers identifying the start points and end points of programming content, and/or the locations of ads or ad pods, and/or the locations of short form content, for example.

It is noted that although FIG. 1 shows high bit rate encrypted content feeds 138a and 138b, and high bit rate encrypted transmission 142 from national network content provider 140 as originating outside collaborative cloud-based content curation system 100, that implementation is merely exemplary. In another implementation, high bit rate encrypted transmission 142 may be generated within collaborative cloud-based content curation system 100, while content feeds 132a and 132b may undergo high bit rate encryption within collaborative cloud-based content curation system 100.

Collaborative cloud-based content curation system 100 is further configured to enable one or both of first and second affiliate content providers 130a and 130b to collaborate in generating fully conditioned IP transport streams 150a and 150b, which may be Mezzanine Multicast IP transport streams, as known in the art. (hereinafter "Mezzanine Multicast IP transport streams 150a and 150b"), for distribution of respective digitally rights cleared content streams 160a and 160b and their corresponding EPGs 162a and 162b to CDN 158. That digitally rights cleared content may then be delivered to end-users, such as consumers of TV program content available online.

Thus collaborative cloud-based content curation system 100 uniquely provides the ability to take a wide array of disparate content feeds from affiliated stations, such as content feeds 132a and 132b from respective first and second affiliate content providers 130a and 130b, and to condition them to meet the ever-changing requirements of digital multi-video programming providers. That is to say, the collaborative content curation solution disclosed by the present application effectively conforms to provide an agnostic broadcast feed. Moreover, the present solution advantageously enhances the metadata payload included in each of Mezzanine Multicast IP transport streams 150a and 150b by allowing source commands from national network content provider 140 as well as first and second affiliate content providers 130a and 130b to not only pass through collaborative cloud-based content curation system 100 to DMVPD headend 156, but to also react and further enhance those commands.

It is noted that, in addition to the features associated with normal operation of collaborative cloud-based content curation system 100 and described above, collaborative cloud-based content curation system 100 also includes features provided to ensure against disruption of content distribution. For example, where digital rights for content included in content feeds 132a and/or 132b have expired, or where digital rights for replacement content identified by either of first and second affiliate content providers 130a and 130b have expired, collaborative cloud-based content curation system 100 may utilize content provided by evergreen/emergency content reel 119 as substitute content. In addition, or alternatively, dynamic failsafe switcher 129 may be utilized to assist in generating digitally rights cleared content streams 160a and 160b in the unexpected event that master control automation unit 120 should malfunction.

Figure 2:
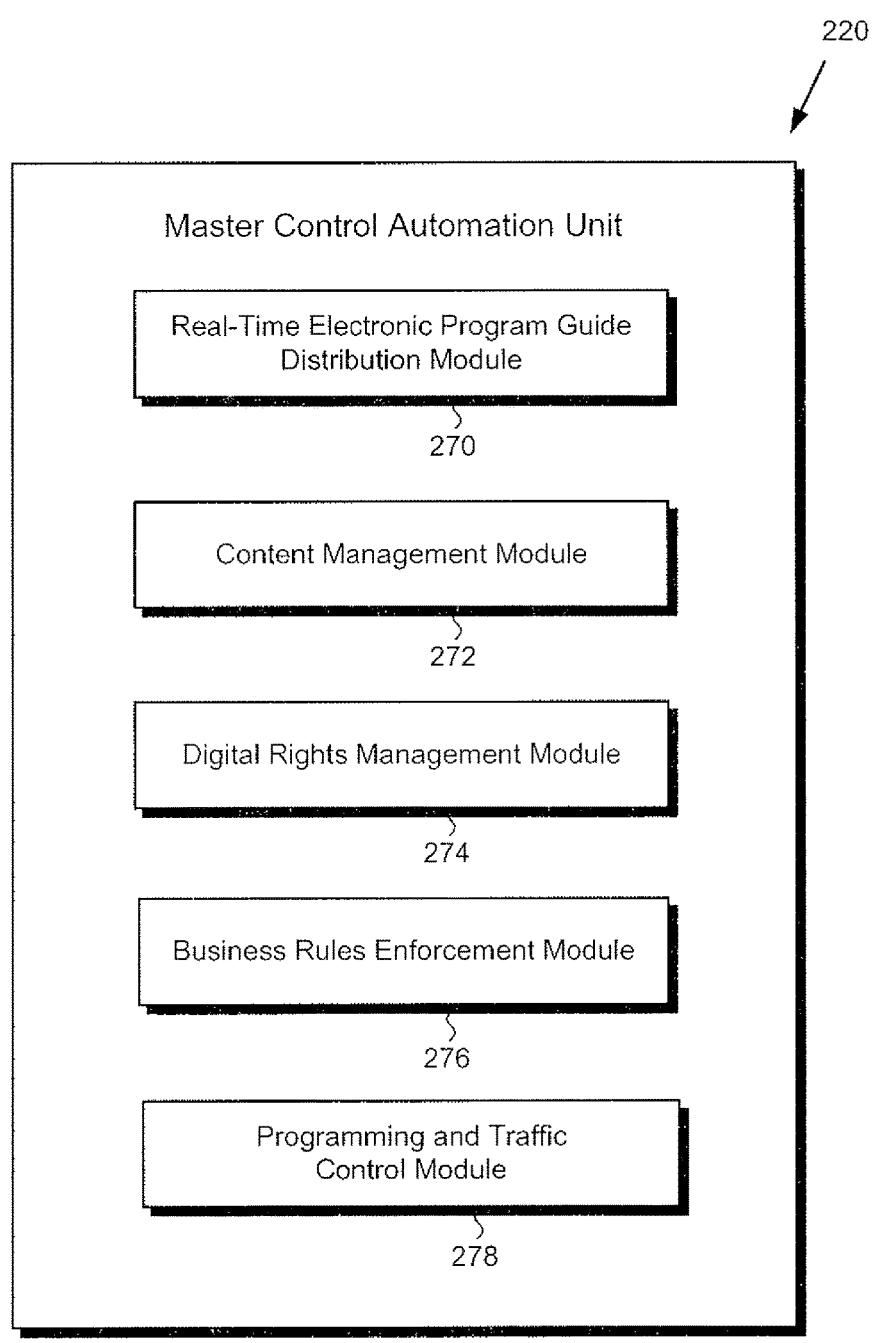
FIG. 2 shows a diagram of an exemplary content curation platform suitable for use in a collaborative cloud-based content curation system, according to one implementation.

FIG. 2 shows a diagram of exemplary master control automation unit 220, according to one implementation. As shown in FIG. 2, example master control automation unit 220 includes real-time EPG distribution module 270, content management module 272, digital rights management module 274, business rules enforcement module 276, and programming and traffic control module 278. Master control automation unit 220 corresponds in general to master control automation unit 120, in FIG. 1, and those corresponding features may share any of the characteristics attributed to either corresponding feature in the present disclosure.

It is noted that, although not explicitly shown in FIG. 2, in some implementations, one or more of real-time EPG distribution module 270, content management module 272, digital rights management module 274, business rules enforcement module 276, and programming and traffic control module 278 can be interactively linked to each other. Moreover, in at least one implementation, real-time EPG distribution module 270, content management module 272, digital rights management module 274, business rules enforcement module 276, and programming and traffic control module 278 can be interactively linked to a web-based affiliate operations portal, such as web-based affiliate operations portal 110, in FIG. 1.

Figure 3:
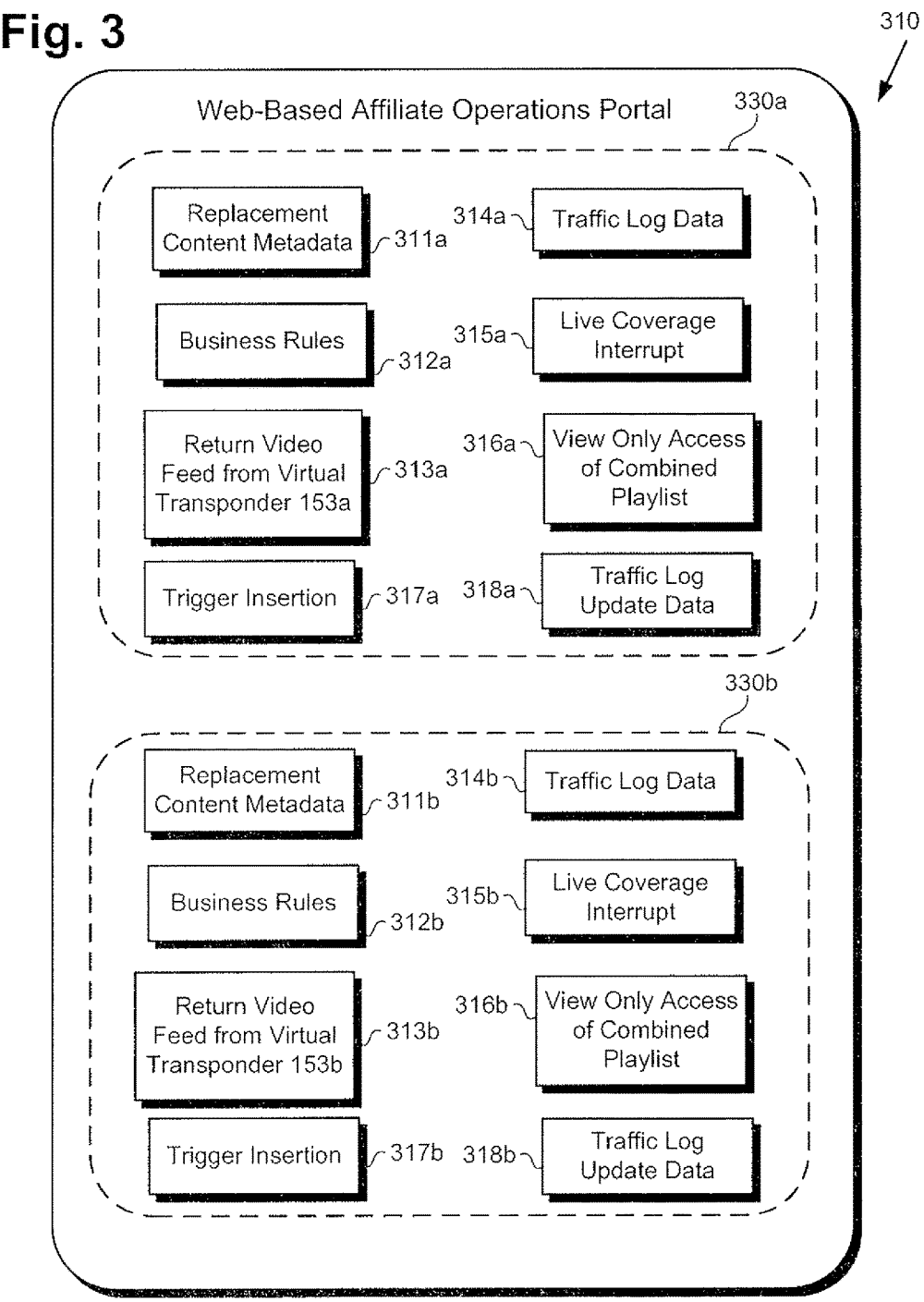
FIG. 3 shows a diagram of an exemplary web-based affiliate operations portal suitable for use in a collaborative cloud-based content curation system, according to one implementation.

FIG. 3 shows a diagram of exemplary web-based affiliate operations portal 310, according to one implementation. As shown in FIG. 3, web-based affiliate operations portal 310 provides first and second individual affiliate operations portals 330a and 330b, corresponding respectively to first and second affiliate content providers 130a and 130b, in FIG. 1. In other words, web-based affiliate operations portal 310 includes first individual affiliate operations portal 330a for use by first affiliate content provider 130a, and second individual affiliate operations portal 330b for use by second affiliate content provider 130b.

It is noted that although the implementations shown by FIG. 1 and FIG. 3 depict two affiliate content providers 130a and 130b, and two individual affiliate operations portals 330a and 330b, that simplified representation is presented merely in the interests of conceptual clarity. More generally, the content distribution environment in which collaborative cloud-based content curation system 100 is utilized may include tens, hundreds, or thousands of affiliate content providers corresponding to first and second affiliate content providers 130a and 130b. Accordingly, in such use cases, web-based affiliate operations portal 310 may include tens, hundreds, or thousands of individual affiliate operations portals, each of which may be used exclusively by a respective one affiliate content provider, for example.

As shown in FIG. 3, each of first and second individual affiliate operations portals 330a and 330b may include replacement content metadata, business rules, a virtual transponder return video feed, and traffic log data. Thus, first individual affiliate operations portal 330a may include replacement content metadata 311a, business rules 312a for first affiliate content provider 130a, return video feed 313a from virtual transponder 153a, and traffic log data 314a. In addition, second individual affiliate operations portal 330b may include replacement content metadata 311b, business rules 312b for second affiliate content provider 130b, return video feed 313b from virtual transponder 153b, and traffic log data 314b.

As further shown in FIG. 3, either or both of first and second affiliate content providers 130a and 130b may submit respective live coverage interrupt request 315a and/or 315b via its respective individual affiliate operations portal 330a or 330b. In addition, either or both of first and second affiliate content providers 130a and 130b may have view only access 316a and/or 316b of the combined playlists included in their respective digital rights cleared content streams 160a and 160b, via its respective individual affiliate operations portal 330a or 330b. Moreover, either or both of first and second affiliate content providers 130a and 130b may provide respective trigger insertion instructions 317a and 317b and/or traffic log update data 318a and 318b via its respective individual affiliate operations portal 330a or 330b. Web-based operations portal 310 corresponds in general to web-based operations portal 110, in FIG. 1, and those corresponding features may share any of the characteristics attributed to either corresponding feature in the present application.

The features shown in FIGS. 1-3 of the present application will be further described by reference to FIG. 4, which presents flowchart 400 outlining an exemplary method for performing collaborative cloud-based content curation in real-time, according to one implementation. With respect to the method outlined in FIG. 4, it is noted that certain details and features have been left out of flowchart 400 in order not to obscure the discussion of the inventive features in the present application.

It is further noted that although flowchart 400 will be described with specific reference to interaction between collaborative cloud-based content curation system 100 and affiliate content provider 130a, that simplified characterization is provided in the interests of conceptual clarity. More generally, the actions outlined in flowchart 400 may be performed by collaborative cloud-based content curation system 100 interacting substantially concurrently with multiple affiliate content providers, such as tens, hundreds, or thousands of affiliate content providers corresponding to first and second affiliate content providers 130a and 130b.

Figure 4:
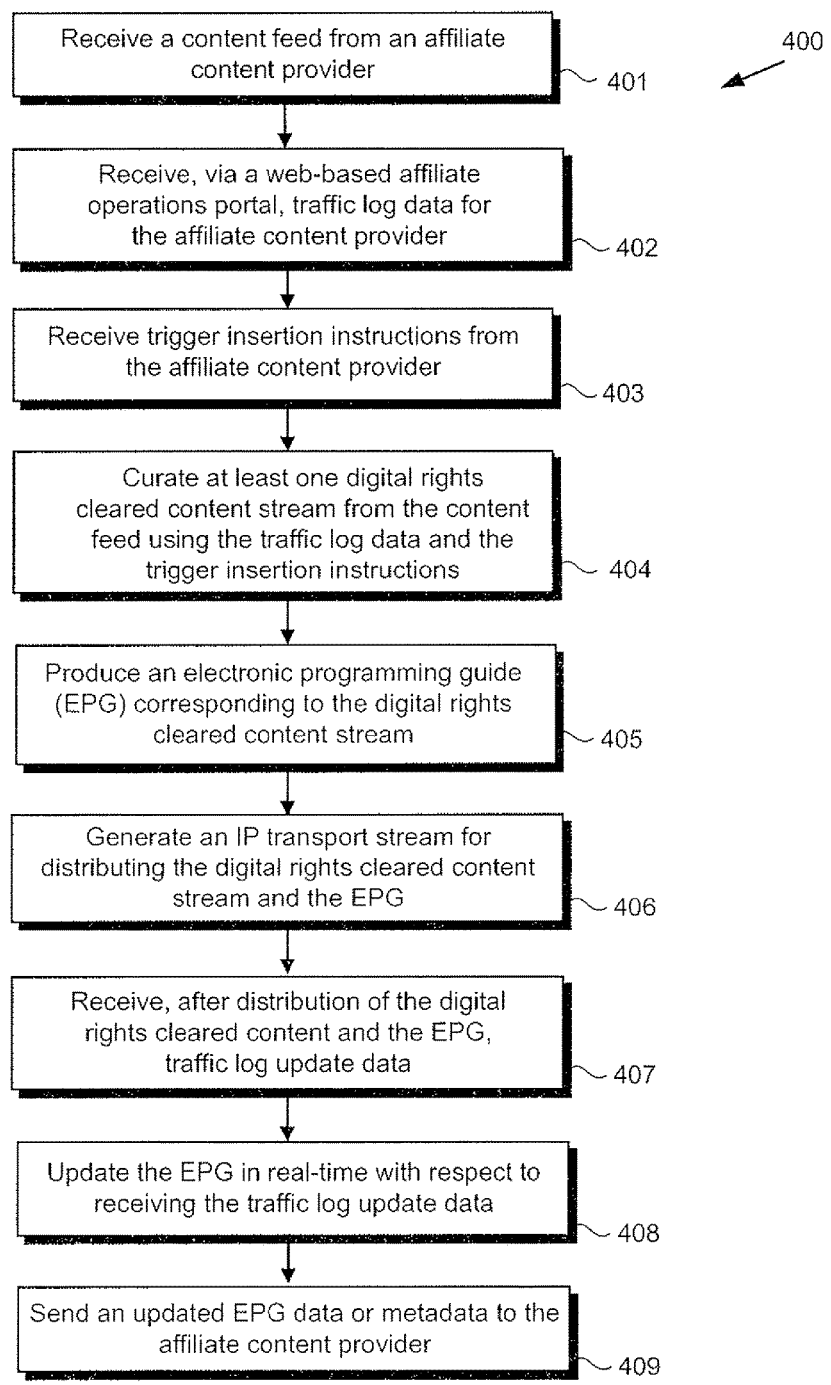
FIG. 4 shows a flowchart presenting an exemplary method for performing collaborative cloud-based automated content curation in real-time, according to one implementation.

Referring to FIG. 4 in combination with FIGS. 1 and 2, flowchart 400 begins with receiving content feed 132a from affiliate content provider 130a (action 401). Content feed 132a may be received, either directly or as high bit rate encrypted content feeds 138a, by master control automation unit 120/220 of collaborative cloud-based content curation system 100, executed by hardware processor 106.

As a specific example, and as noted above, affiliate content provider 130a may be a local Los Angeles based content provider corresponding to affiliate KXYZ-TV of a New York based parent station of the XYZ Broadcasting Company and depicted as national network content provider 140. According to the exemplary implementation shown in FIG. 1, affiliate content provider 130a provides content feed 132a for delivery into collaborative cloud-based content curation system 100. Depending upon the content contained in content feed 132a and the digital rights to that content acquired by affiliate content provider 130a, content feed 132a may include digital rights cleared content and/or content for which digital rights have not been cleared.

According to the present exemplary implementation, content feed 132a undergoes high bit rate encryption performed by high bit rate encryption service 134a and is ingested by master control automation unit 120/220 as high bit rate encrypted content feed 138a. In addition to high bit rate encrypted content feed 138a, master control automation unit 120/220 ingests high bit rate encrypted transmission 142 from national network content provider 140.

Flowchart 400 continues with receiving, via web-based affiliate operations portal 110/310, traffic log data 314a for affiliate content provider 130a (action 402). Traffic log data 314a may be received by programming and traffic control module 278 of master control automation unit 120/220, for example, executed by hardware processor 106.

Affiliate content provider 130a may utilize individual affiliate operations portal 330a of web-based affiliate operations portal 110/310 to provide traffic log data 314a identifying its planned programming schedule for the next twenty-four hours, and may provide that data on a daily basis, for example. Due to the variety of formats in which traffic log data 314a may be delivered to collaborative cloud-based content curation system 100 via web-based affiliate operations portal 110/310, collaborative cloud-based content curation system 100 may include traffic log translator 122 to ensure that traffic log data 314a is provided to master control automation unit 120/220 in a consistent format.

Flowchart 400 continues with receiving trigger insertion instructions 317a from affiliate content provider 130a (action 403). The trigger insertion instructions may be received by content management module 272 of master control automation unit 120/220, for example, executed by hardware processor 106.

Triggers may take the form of digital or analog signals used to identify the start points and/or end points of content, which may include programming content, locations of ads or ad pods, or short form content, for example. As shown by FIG. 3, in some implementations, trigger insertion instructions 317a may be received by master control automation unit 120/220 via web-based affiliate operations portal 110/

310. However, in other implementations, master control automation unit 120/220 may receive trigger insertion instructions 317a, not via web-based affiliate operations portal 110/31, but in a trigger insertion message received from affiliate content provider 130a that is out-of-band with respect to content feed 132a, i.e. not embedded with content feed 132a.

For example, affiliate content provider 130a may send a trigger insertion message out-of-band directly to master control automation unit 120/220. Once received, master control automation unit 120/220 may read the timestamp of the trigger insertion message and insert an SCTE trigger that takes account of the latency of content feed 132a. For example, a trigger insertion message including trigger insertion instructions 317a and a time stamp may be sent out at 12:00:00:00 PST from affiliate content provider 130a to master control automation unit 120/220. Master control automation unit 120/220 reads that time stamp, determines that content feed 132a will take 3 seconds and 16 frames to reach master control automation unit 120/220, and thus waits for 12:00:03:16 PST to insert the SCTE trigger. That is to say, hardware processor 106 may execute master control automation unit 120/220 to insert a trigger into content feed 132a based on trigger insertion instructions 317a included in the trigger insertion message and the time stamp included in the trigger insertion message.

Flowchart 400 continues with curating digital rights cleared content stream 160a from content feed 132a using traffic log data 314a and trigger insertion instructions 317a (action 404). Curation of digital rights cleared content stream 160a from content feed 132a may be performed by master control automation unit 120/220, executed by hardware processor 106, and using digital rights management module 274.

For example, master control automation unit 120/220 may act on high bit rate encrypted content feed 138a using replacement content and/or slates obtained from video storage 122, and/or graphics obtained from graphics engine 126, and/or instructions obtained from secondary event/trigger and pod manipulation module 128. As a specific example, if content stream 132a includes TV program "A" for which digital distribution rights are not held by affiliate content provider 130a, alternative TV program "B" for which digital rights are cleared may be substituted for program "A". In those cases, and based on features of program "B" known or determined by master control automation unit 120/220, short form content such as advertising, interstitial content, and/or graphics can be identified and curated for inclusion with program "B" automatically by master control automation unit 120/220.

In some implementations, affiliate content provider 130a and can utilize individual affiliate operations portal 330a of web-based affiliate operations portal 110/310 to provision collaborative cloud-based content curation system 100 with the short form replacement content available to master control automation unit 120/220. Affiliate content provider 130a can further utilize individual affiliate operations portal 330a of web-based affiliate operations portal 110/310 to identify kill dates for each short form replacement content item, identifying a date after which a particular short form replacement content item should no longer be used by master control automation unit 120/220.

As a result of the collaboration between affiliate content provider 130a and master control automation unit 120/220 enabled by web-based affiliate operations portal 110/310, collaborative cloud-based content curation system 100 curates digital rights cleared content stream 160a from content feed 132a. That is to say, digital rights cleared content stream 160a may include digital rights cleared content originally provided in content feed 132a. In addition, digital rights cleared content stream 160a may include replacement content for which digital rights are cleared, or graphics, for example, as substitutes for content originally provided in content feed 132a but for which digital rights remain uncleared.

In addition, affiliate content provider 130a may utilize view only access 316a provided by individual affiliate operations portals 330a to observe the changes made to content feed 132a in the process of curating digital rights cleared content stream 160a. Affiliate content provider 130a may further utilize individual affiliate operations portal 330a of web-based affiliate operations portal 110/310 to request changes to digital rights cleared content stream 160a, or to provide replacement content metadata 311a, and/or traffic log data 314a, and/or business rules 312a.

Flowchart 400 continues with producing EPG 162a corresponding to digital rights cleared content stream 160a (action 405). Production of EPG 162a corresponding to digital rights cleared content stream 160a may be performed by master control automation unit 120/220, executed by hardware processor 106, and using real-time EPG distribution module 270.

Flowchart 400 continues with generating Mezzanine Multicast IP transport stream 150a for distributing digital rights cleared content stream 160a and its corresponding EPG 162a (action 406). Generation of Mezzanine Multicast IP transport stream 150a may be performed by master control automation unit 120/220, executed by hardware processor 106.

As shown in FIG. 1. Mezzanine Multicast IP transport stream 150 may be provided as an output from collaborative cloud-based content curation system 100 for distributing digital rights cleared content stream 160a and EPG 162a. It is noted that Mezzanine Multicast IP transport stream 150a is depicted using a broad arrow to indicate that Mezzanine Multicast IP transport stream 150a may include multiple digital rights cleared content streams 160a and multiple corresponding EPGs 162a. Similarly, Mezzanine Multicast IP transport stream 150b is depicted using a broad arrow to indicate that Mezzanine Multicast IP transport stream 150b may include multiple digital rights cleared content streams 160b and multiple corresponding EPGs 162b.

As further shown in FIG. 1, Mezzanine Multicast IP transport stream 150a may provide an IP transport stream as an output from collaborative cloud-based content curation system 100 to Los Angeles based Meet Me Room 152, via virtual transponder 153a. From Los Angeles based Meet Me Room 152, transmissions corresponding to the IP transport stream provided by Mezzanine Multicast IP transport stream 150a may be forwarded to DMVPD headend 156 for further delivery to CDN 158.

It is noted that, in addition to serving as a transmission interface for distribution of Mezzanine Multicast IP transport stream 150a through Los Angeles based Meet Me Room 152, virtual transponder 153a may also serve as an application programming interface (API) for communications into collaborative cloud-based content curation system 100. For example, virtual transponder 153a may be utilized to provide return video feed 313a via individual affiliate operations portals 330a, and/or may be used to request delivery of out-of-band programming metadata 151a.

Flowchart 400 continues with receiving, after distribution of digital rights cleared content stream 160a and EPG 162a, traffic log update data 318a (action 407). Traffic log update data 318a may be received via individual affiliate operations portal 330a of web-based affiliate operations portal 110/310 by programming and traffic control module 278 of master control automation unit 120/220, executed by hardware processor 106. For example, affiliate content provider 130a may utilize individual affiliate operations portal 330a of web-based affiliate operations portal 110/310 to provide traffic log update data 318a identifying dynamic changes to its programming schedule.

Flowchart 400 continues with updating EPG 162a in real-time with respect to receiving traffic log update data 318a (action 408). Real-time updating of EPG 162a with respect to receiving traffic log update data 318a may be performed by real-time EPG distribution module 270 of master control automation unit 120/220, executed by hardware processor 106.

Any dynamic changes to the programming schedules included in traffic log data 314a may be acted on by using real-time EPG distribution module 270 of master control automation unit 120/220 to ensure that EPG 162a distributed via virtual transponder 153a is substantially continuously updated. It is noted that, in some implementations, data or metadata enabling real-time updating of EPG 162a may be included as part of in-band programming data or metadata distributed using Mezzanine Multicast IP transport stream 150a. Alternatively, the data or metadata enabling real-time updating of EPG 162a may be included as part of out-of-band program data and/or metadata 151a.

Flowchart 400 can conclude with sending updated EPG data or metadata to affiliate content provider 130a (action 409). The updated EPG data or metadata may be sent to affiliate content provider 130a directly, or via individual affiliate operations portal 330a of web-based affiliate operations portal 110/310. The updated EPG data or metadata may be sent to affiliate content provider 130a using real-time EPG distribution module 270 of master control automation unit 120/220, executed by hardware processor 106. It is noted that the combination of traffic log data 314a and traffic log update data 318a with the API integration with collaborative cloud-based content curation system 100 provided by virtual transponder 153a enables EPG 162a to be as enriched and up to date as DMVPD headend 156 is configured to allow.

In addition to providing traffic log data 314a, trigger insertion instructions 317a, and traffic log update data 318a, affiliate content provider 130a may utilize individual affiliate operations portal 330a of web-based affiliate operations portal 110/310 to provide replacement content metadata 311a for use by master control automation unit 120/220 to identify replacement content for use as a substitute for content included in content feeds 132a or 132b but for which digital distribution rights have not been cleared. In addition, in some implementations affiliate content provider 130a may provide the replacement content identified by replacement content metadata 311a to video storage 124 via individual affiliate operations portal 330a of web-based affiliate operations portal 110/310. It is noted that, in some implementations, replacement content metadata 311a may be included as part of in-band programming metadata distributed using respective Mezzanine Multicast IP transport streams 150a.

Moreover, in some implementations, collaborative cloud-based content curation system 100 is configured to provide black-out information for some portion of the content included in content feed 132a. For example, black-out information for covering or diverting away from content included in content feed 132a, but for which digital rights have not been cleared, may be included as part of a metadata payload within Mezzanine Multicast IP transport stream 150a, and/or may be provided through EPG 162a.

In the event that content for which digital rights have not been cleared needs to be blacked out, collaborative cloud-based content curation system 100 may be configured to replace the content for which digital rights have not been cleared with one or more full page graphics. For example, according to the exemplary implementation shown in FIG. 1, collaborative cloud-based content curation system 100 may be configured to acquire such a full page graphic or graphics from full page slide 131.

Furthermore, business rules 312a may also be received by collaborative cloud-based content curation system 100 via individual affiliate operations portal 330a of web-based affiliate operations portal 110/310. However, that representation is merely exemplary. In some implementations, business rules 312a for affiliate content provider 130a may be received directly from affiliate content provider 130a, or may be received from national network content provider 140.

Business rules 312a and 312b may be individualized for each of first and second affiliate content providers 130a and 130b, and may specify different strategies for responding to the presence of substantially the same content in content feeds 132a and 132b. For example, if each of content feeds 132a and 132b includes TV program "A" for which digital distribution rights are not held by either of first and second affiliate content providers 130a and 130b, business rules 312a may specify replacement of TV program "A" with replacement content identified by replacement content metadata 311a. By contrast, business rules 312b may specify that digital distribution rights be acquired if the cost of acquisition meets of falls below a predetermined cost threshold, but that TV program "A" be replaced with replacement content identified by replacement content metadata 311b if the cost of acquiring digital distribution rights is too high, i.e., exceeds the predetermined cost threshold.

Thus, curation of digital rights cleared content stream 160a from content feed 132a, in action 404, may further be performed using replacement content metadata 311a and business rules 312a.

In some implementations, master control automation unit 120/220 may receive, via individual affiliate operations portal 330a of web-based affiliate operations portal 110/310, live coverage interrupt request 315a from affiliate content provider 130a. Live coverage interrupt request 315a may be provided by affiliate content provider 130a to indicate that there is an emergency broadcast, or a breaking or live news event that takes priority over planned programming included in traffic log data 314a.

Master control automation unit 120/220 may modify digital rights cleared content stream 160a curated from content feed 132a based on live coverage interrupt request 315a. Moreover, in some implementations, modifying digital rights cleared content stream 160a may be performed substantially in real-time with respect to receiving live coverage interrupt request 315a.

Thus, the present application discloses a cloud-based solution configured to automate collaborative content curation using a web-based operations portal accessible by broadcast affiliates, to ensure that digital content is appropriately distributed for display to viewers over the Internet.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A collaborative cloud-based content curation system comprising:
   a content curation platform including a hardware processor and a memory;
   a master control automation unit stored in the memory;
   a web-based affiliate operations portal interactively linked to the master control automation unit;
   the hardware processor configured to execute the master control automation unit to:
      receive a content feed from an affiliate content provider;
      receive, via the web-based affiliate operations portal, traffic log data for the affiliate content provider;
      receive trigger insertion instructions from the affiliate content provider;
      curate a digital rights cleared content stream from the content feed using the traffic log data and the trigger insertion instructions;
      produce an electronic programming guide (EPG) corresponding to the digital rights cleared content stream;
      generate an Internet Protocol (IP) transport stream for distributing the digital rights cleared content stream and the EPG;
      receive, after distribution of the digital rights cleared content and the EPG, a traffic log update data; and
      update the EPG in real-time with respect to receiving the traffic log update data.

2. The collaborative cloud-based content curation system of claim 1, wherein the trigger insertion instructions are received via the web-based affiliate operations portal.

3. The collaborative cloud-based content curation system of claim 1, wherein the trigger insertion instructions are received via a message from the affiliate content provider that includes a time stamp, the message being out-of-band with respect to the content feed.

4. The collaborative cloud-based content curation system of claim 3, wherein the hardware processor is further configured to execute the master control automation unit to insert a trigger into the content feed based on the trigger insertion instructions and the time stamp.

5. The collaborative cloud-based content curation system of claim 1, wherein an EPG update data for updating the EPG in real-time is distributed via the IP transport stream.

6. The collaborative cloud-based content curation system of claim 1, wherein an EPG update data for updating the EPG in real-time is distributed out-of-band with respect to the IP transport stream.

7. The collaborative cloud-based content curation system of claim 1, wherein the IP transport stream is a Mezzanine Multicast IP transport stream.

8. The collaborative cloud-based content curation system of claim 1, wherein the hardware processor is further configured to execute the master control automation unit to receive, via the web-based affiliate operations portal, replacement content metadata for the affiliate content provider, and business rules for the affiliate content provider.

9. The collaborative cloud-based content curation system of claim 8, wherein the hardware processor is configured to execute the master control automation unit to curate the at least one digital rights cleared content stream further using the replacement content metadata and the business rules.

10. The collaborative cloud-based content curation system of claim 1, wherein the hardware processor is further configured to execute the master control automation unit to receive, via the web-based affiliate operations portal, a live coverage interrupt request from the affiliate content provider, and to modify the digital rights cleared content stream based on the live coverage interrupt request in real-time with respect to receiving the live coverage interrupt request.

11. A method for use by a collaborative cloud-based content curation system including a content curation platform having a hardware processor and a memory storing a master control automation unit, and a web-based affiliate operations portal interactively linked to the master control automation unit, the method comprising:
   receiving, by the master control automation unit executed by the hardware processor, a content feed from an affiliate content provider;
   receiving, via the web-based affiliate operations portal by the master control automation unit executed by the hardware processor, traffic log data for the affiliate content provider;
   receiving, by the master control automation unit executed by the hardware processor, trigger insertion instructions from the affiliate content provider;
   curating, by the master control automation unit executed by the hardware processor, a digital rights cleared content stream from the content feed using the traffic log data and the trigger insertion instructions;
   producing, by the master control automation unit executed by the hardware processor, an electronic programming guide (EPG) corresponding to the digital rights cleared content stream;
   generating, by the master control automation unit executed by the hardware processor, an Internet Protocol (IP) transport stream for distributing the digital rights cleared content stream and the EPG;
   receiving, by the master control automation unit executed by the hardware processor, after distribution of the digital rights cleared content and the EPG, a traffic log update data; and
   updating, by the master control automation unit executed by the hardware processor, the EPG in real-time with respect to receiving the traffic log update data.

12. The method of claim 11, wherein the trigger insertion instructions are received via the web-based affiliate operations portal.

13. The method of claim 11, wherein the trigger insertion instructions are received via a message from the affiliate content provider that includes a time stamp, the message being out-of-band with respect to the content feed.

14. The method of claim 11, further comprising inserting, by the master control automation unit executed by the hardware processor, a trigger into the content feed based on the trigger insertion instructions and the time stamp.

15. The method of claim 11, wherein an EPG update data for updating the EPG in real-time is distributed via the IP transport stream.

16. The method of claim 11, wherein an EPG update data for updating the EPG in real-time is distributed out-of-band with respect to the IP transport stream.

17. The method of claim 11, wherein the IP transport stream is a Mezzanine Multicast IP transport stream.

18. The method of claim 11, further comprising receiving, via the web-based affiliate operations portal by the master control automation unit executed by the hardware processor, replacement content metadata for the affiliate content provider, and business rules for the affiliate content provider.

19. The method of claim 18, wherein curating the at least one digital rights cleared content stream is performed further using the replacement content metadata and the business rules.

20. The method of claim 11, further comprising receiving, via the web-based affiliate operations portal by the master control automation unit executed by the hardware processor, a live coverage interrupt request from the affiliate content provider, and modifying the digital rights cleared content stream based on the live coverage interrupt request in real-time with respect to receiving the live coverage interrupt request.

* * * * *